May 6, 1969
W. FRITSCHE
3,442,466
TAKE-UP REELING DEVICE FOR SAFETY BELTS
AND/OR SIMILAR APPLIANCES
Filed April 8, 1966
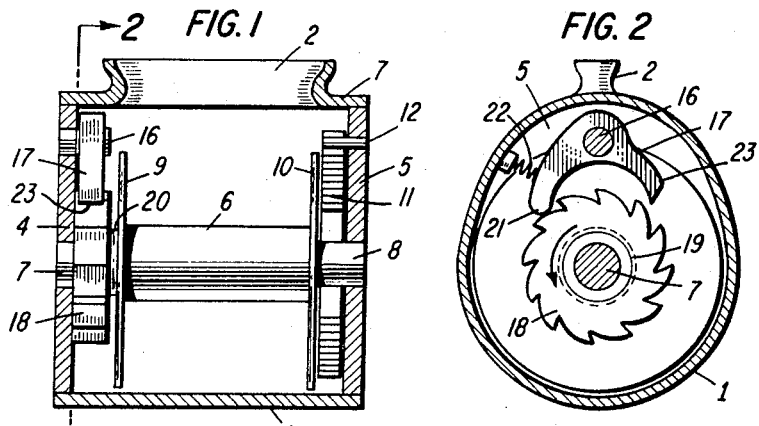
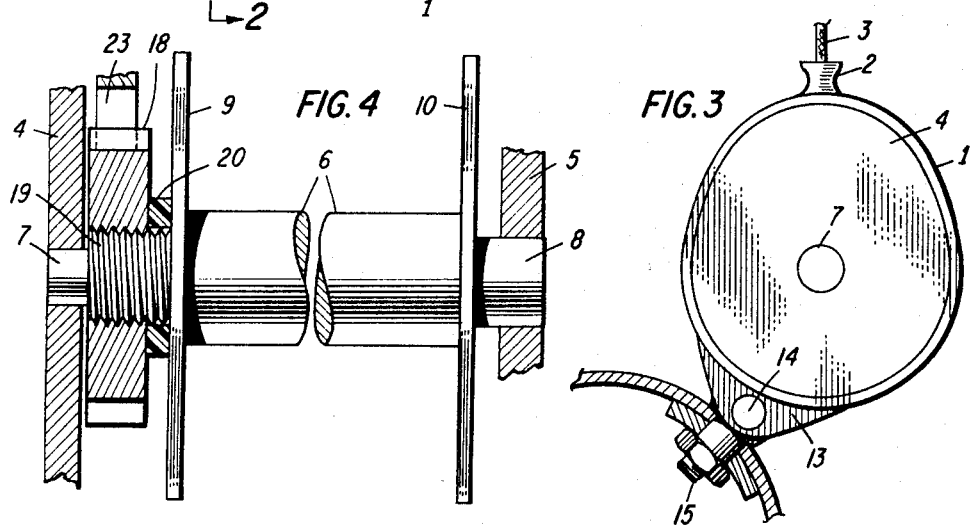
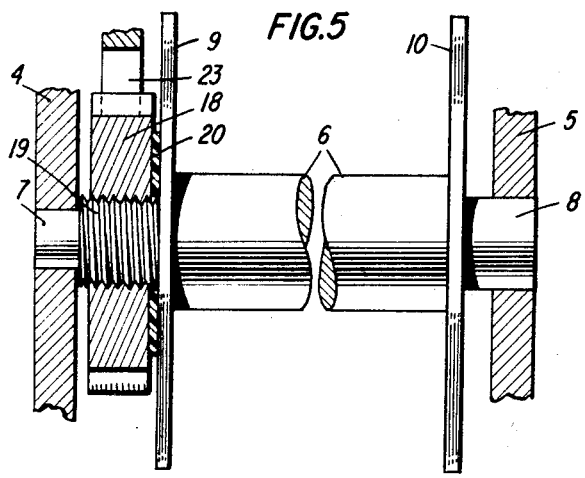
INVENTOR
WALTER FRITSCHE
BY *Alvin Browdy*
ATTORNEY United States Patent Office 3,442,466
Patented May 6, 1969

3,442,466
TAKE-UP REELING DEVICE FOR SAFETY BELTS
AND/OR SIMILAR APPLIANCES
Walter Fritsche, Augusburg, Germany, asignor to Firma
Tenka-Automaten, Kirschner & Co., Dusseldorf, Germany
Filed Apr. 8, 1966, Ser. No. 553,596
Int. Cl. B65h 75/48; A62b 1/08
U.S. Cl. 242—107.4     4 Claims

ABSTRACT OF THE DISCLOSURE

A reel for winding up and storing a safety or seat belt. The belt may be pulled off the reel smoothly against the action of a rewind spring unless the belt is jerked suddenly, as in a collision. When the belt is jerked, a pawl which is attached to the reel housing engages a notched ratchet attached to the reel to stop the belt from unwinding. A disc of soft malleable material is crushed between the reel and the reel housing to absorb the shock when the reel suddenly locks.

---

The present invention relates to a take-up reeling device for safety belts, seat belts, or similar appliances, which are retractable or rollable under spring-pull, and are appropriately installed in motor vehicles, or at jeopardous work places.

A prior art device of this kind has been constructed by using a reeling-up pulley which is under constant spring-pull so that the safety belt, when not in use, will be kept automatically rolled up.

A considerable disadvantage of such a safety belt arrangement is as is the case with nonretractable safety belts, that they have to be shortened or elongated for small or tall persons in order to keep these persons tight to their seats in case of a collision. Another disadvantage with regard to prior retractable safety belts which do not require adjustments, when used by smaller persons, is that these belts will be pulled out to their full length in case of a collision and thus the effective function of such belts will be considerably reduced.

Basically, with regard to the present invention, the problem to be solved was to create a safety belt mechanism which would unwind automatically as well as roll up the belt when not in use, without the need for longitudinal adjustment of the safety belt and, simultaneously, to provide effective adhesion of the passenger to his seat.

In conformity with the present invention the above problem was solved by means of a blocking mechanism which was ineffective at a slow unreeling of the safety belt contrary to a wind-up effect, while the same blocking mechanism, however, would react to a sudden or jerky pull, or impact, by stopping dead each continued unreeling tendency of such safety belt.

In conformity with the invention the device offers a further decisive advantage in that the person being protected by such a safety belt will have full freedom of motion in his seat and must overcome nothing but the slight resistance to traction being exerted by the aforesaid wind-up spring on the safety belt which, at the same time will not essentially alter its length in case of a collision.

By being kept in smooth and free contact on the person to be protected, the safety belt, in conformity with the invention, at a sudden or jerky pull or impact, will instantly be prevented from unreeling, and therefore the gravitational momentum will be less than that in comparison with those prior art devices.

In conformity with the invention take-up reeling device will be constructed in such way that a ratchet wheel is threadedly mounted on the spindle of a re-winding mechanism of the safety belt and to function only in case of a sudden or abrupt pull or impact exerted on the safety belt, a ratchet-and-pawl mechanism being provided and constructed in such way that the pawl, when engaging the teeth of the ratchet wheel, continued unreeling of the belt will be prevented or stopped completely. For such purpose the ratchet is provided with a shoulder which slides along the external toothing of the ratchet wheel at its slow rotation, which shoulder, however, in case of an abruptly accelerated rotation of the ratchet wheel, will get a stroke through which the pawl of the ratchet will engage the teeth of the ratchet wheel and block it completely.

In conformity with the invention said ratchet wheel is not fixed rigidly on the spindle of the re-winding mechanism but arranged movable thereto in such way that in the event of a blocking of the ratchet wheel no abrupt, but an equally gradual, blocking of the safety belt will take place. In conformity with the invention this effect is specifically achieved through locating the ratchet wheel by means of a thread arranged turnable round the spindle of the re-winding mechanism of the safety belt, and furthermore by means of a disk made of malleable material and fixed rigidly to the spindle of the re-winding mechanism which, in conformity with the invention should consist of soft metal, say, as lead, tin, or the like. In conformity with the invention this important function will be shown through a mutual approach between the ratchet wheel and one wall of the housing, thus causing a crushing deformation of said disk under correspondingly effective impact-work absorption or cancellation.

A particularly advantageous design will be achieved through fixing the spindle of the re-winding mechanism of the safety belt through the opposite walls of a housing, one wall of which also carries the before mentioned pawl.

In conformity with the invention such housing should be constructed in such a way that within its interior the completely rolled-up safety belt will find the very space it needs; the housing should fit the shape of the completely rolled-up safety belt and show a slotted opening through which the whole length of the safety belt will be led.

In conformity with the invention a spring, say, in form of a spiral (balance) spring will be arranged between the spindle of the re-winding mechanism and the walls of the housing with the purpose to re-wind the safety belt.

Detailed drawings showing particulars of the invention are herewith supplied in connection with the present patent application thus forming an essential prerequisite of such application. The drawings show:

FIG. 1 is a vertical sectional view of the invention with the housing in section and interior parts shown in elevation;

FIG. 2 is a transverse sectional view taken substantially on the line 2—2 of FIG. 1;

FIG. 3 is an end elevational view of the invention illustrating a typical mounting means in a motor vehicle;

FIG. 4 is a view of the take-up reel disassociated from its housing with the reel in a free-moving condition; and FIG. 5 is a view similar to FIG. 4 wherein the take-up reel has been braked, and illustrating the lateral movement of the reel relative to the ratchet.

As obviously shown by FIGS. 1 to 3, it will be considered appropriate to design the shape of the housing to the reeling-up device in the wound-up condition of the safety belt. This housing is composed of an outer casing 1 and is equipped with a kind of slot 2 through which the safety belt 3 can be pulled out of the housing. The outer casing 1 is closed by walls 4 and 5 which can be fixed to the casing in any appropriate way (this detail not shown on the drawings) eventually through screwing, riveting, welding and/or any other appropriate method.

The spindle 6 of the re-winding mechanism is fixed by its one end 7 to the wall 4, and by its other end 8 to the opposite wall 5 of the casing in a rotating way. The end-piece of the safety belt will be fastened firmly in the middlemost of the spindle 6. This detail is also not shown on the drawings. Rigidly mounted disks 9 and 10 will cause the safety belt to be wound-up evenly on the reeling device or the take-up roll.

A spring, proposedly a spirally rolled tension spring 11, will be fixed to one end of the take-up roll 8 and, with its other end in combination with a pin 12, be fixed to the wall 5 of the casing. This spring has sufficient tractive power and it is prestressed in such a way that it will pull the safety belt completely into the casing up to a stopping device (this detail not shown on the drawings) provided, there will be no counter-pull exerted on the safety belt 3. Proposedly, such stopping device may consist of a hook or a ring which might serve for the mounting of the other end of the safety belt on the second fixture mark.

In conformity with the invention, a proposed arrangement of the device is shown in FIG. 3. On the outer surface of the casing may be incorporated two flanges or legs 13 through which a pin 14 may be inserted which again is connected with a screw 15. This screw will be mounted safely to an appropriate part of a motor vehicle and the like, proposedly the cardan shaft tunnel, seat frame or the bottom plate of the car. The casing 1 will be constructed slewably round the pin 14.

The spindle 6 of the reeling mechanism, or the take-up roll, will be fitted with a thread 19 within the area or the reach of the butt 7, on which thread a ratchet wheel 18 will be screwed (as shown on FIGS. 4 and 5). Between the ratchet wheel 18 and the border disc 9 is arranged a disk 20 or the like made of malleable material, preferably to be soft metal as lead, tin, plastics or anything the like, which would be suitable for the purpose.

On a pin 16 fixed to the wall 4, there is rotatably mounted a pawl arrangement, the shoulders of which 23 and 21 will be freely pressed against the teeth of the ratchet wheel 18 under pressure of a spring 22 which is supported by the outer casing 1. The essential shoulder 23 of the pawl 17 will engage the teeth of the ratchet wheel 18 and block its rotary motion.

In conformity with the invention, the operation of the aforesaid device is as follows:

When the safety belt is not tightened to the passenger it will be kept automatically in its casing 1 through the mechanical action of the spring 11 so that the belt will be kept invisible, and form in no way an obstacle for passengers when getting in or out of the vehicle. When the safety belt is to be brought to its intended use it will, in antagonistic direction of the tension of the spring 11, be pulled out of the casing and—for example—arranged diagonally across the chest of the person to be protected, or arranged in any other way and fixed to the second fastening point by means of the before mentioned hook or ring (these details not shown on the drawings) or the like.

In case the person protected by this safety belt wants to perform slow forward and backward motions, the shoulder 21 of the ratchet glides along the external toothing of the ratchet wheel 18 rotating equally with the take-up roll, and the safety belt will be always kept in smooth and slightly elastic strain on the person and following his movements as it is drawn out of the casing, and pulled in again by its own tensile force.

However, in case of a collision or the like when said person or passenger is forced to a sudden or jerky forward motion which will cause a likewise sudden pull on the safety belt 3, the shoulder 21 of the pawl 17 will get a sudden stroke from the teeth of the ratchet wheel 18 and, contrary to the pressure of the spring 22, the shoulder 23 of the pawl will engage the teeth of the ratchet wheel 18 so that an immediate blocking will take place.

The shoulder 21 may be equipped with an adjusting screw or the like in order to arrange for an adjustment of the reaction time of the blocking device at more or less hasty motions of the passenger or person.

Consequently, an inventional essentiality will be that at slow motions which should be allowed to each passenger or person, the blocking device will not respond, while at a sudden pull or push exerted against the safety belt, the blocking device will produce the desired effect.

Furthermore an inventional essentiality being the aforementioned disk 20 made of malleable or soft metal and contributing in the main to the absorption or cancellation of the enormous impact effect produced in the event of a collision.

If, namely, the ratchet wheel 18 becomes blocked by the shoulder 23 of the pawl 17, a sudden and rigid blocking of the rotating motion of the spindle 6 of the rewinding mechanism occurs, which reaction would cause an obvious and dangerous risk of a rupture of the blocking mechanism, but instead of such occurrence the ratchet wheel 18 rotates on the thread 19 towards the border disc 9 and as a result of this process the malleable disk 20 will be squeezed until, in case of a collision, it will take on about the shape 20 shown on FIG. 5. The effective operation of this inventional device is the demonstration of the gradual exposition of the safety belt to the enormous tensile load, at which process a great amount of the impact work will become absorbed or cancelled by means of said malleable disk 20.

The intended use of the aforementioned inventional device may be realized in such situations in which any persons wherever shall be protected from a sudden and/or jerky pull or shock or anything the like which might happen to them in vehicles of all kind, aircraft and/or the like. Aforesaid inventional device can also be applied to every work condition under which any person will be exposed to any jeapardous situation.

The practicability of any other constructional design and type except and beyond the conventional design and type in conformity with all details of the drawings herewith supplied is herewith pointed out to form an integrated part of this invention.

What is claimed is:

1. A take-up reel for safety belts comprising
    a housing to enclose the rolled-up belt;
    a spindle mounted within the housing to roll the belt on;
    means connected to the spindle to rewind the belt when it is unwound from the spindle;
    brake means comprising a ratchet and pawl;
    means for mounting said ratchet on the spindle; and
    shock absorbing means for protecting the belt when it unwinding is suddenly stopped.

2. The device of claim 1 wherein the pawl is mounted on the housing, is U-shaped, and is normally positioned out of contact with the ratchet.

3. The device of claim 2 wherein the ratchet mounting means comprises threads on the end of the spindle.

4. The device of claim 3 wherein the shock absorbing means comprises a malleable disc.

References Cited

UNITED STATES PATENTS

| | | | |
|---|---|---|---|
| 2,659,573 | 11/1953 | Smith | 254—152 |
| 2,729,425 | 11/1956 | Gschwind | 254—157 |
| 2,546,202 | 3/1951 | Trouin | 254—153 |
| 2,979,282 | 4/1961 | Barecki | 242—107.4 |
| 2,990,131 | 6/1961 | Carlsson | 242—107.4 |

FOREIGN PATENTS 521,950 8/1953 Belgium.

WILLIAM S. BURDEN, *Primary Examiner.*

U.S. Cl. X.R.

254—152